(12) United States Patent
Skowyra et al.

(10) Patent No.: US 12,314,734 B1
(45) Date of Patent: May 27, 2025

(54) OPERATING SYSTEM SERVICE EXTENSIONS FOR MICROKERNELS

(71) Applicant: Massachusetts Institute of Technology, Cambridge, MA (US)

(72) Inventors: Richard W. Skowyra, Somerville, MA (US); Samuel Jero, Waltham, MA (US); Juliana Furgala, Waltham, MA (US); Bryan C. Ward, Melrose, MA (US); Roger Khazan, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 310 days.

(21) Appl. No.: 17/663,702

(22) Filed: May 17, 2022

Related U.S. Application Data

(60) Provisional application No. 63/189,410, filed on May 17, 2021.

(51) Int. Cl.
 *G06F 9/445* (2018.01)
 *G06F 9/30* (2018.01)
 *G06F 9/54* (2006.01)

(52) U.S. Cl.
 CPC ...... *G06F 9/44505* (2013.01); *G06F 9/30087* (2013.01); *G06F 9/541* (2013.01); *G06F 9/545* (2013.01)

(58) Field of Classification Search
 CPC .... G06F 9/4406; G06F 9/44505; G06F 9/541; G06F 9/545; G06F 9/30087
 See application file for complete search history.

(56) References Cited

U.S. PATENT DOCUMENTS

| | | | | |
|---|---|---|---|---|
| 6,075,939 | A * | 6/2000 | Bunnell | G06F 9/44521 717/107 |
| 6,832,266 | B1 * | 12/2004 | Shaylor | G06F 9/544 719/321 |
| 7,410,542 | B2 | 8/2008 | Nolan et al. | |
| 7,466,390 | B2 | 12/2008 | French et al. | |
| 11,366,922 | B1 * | 6/2022 | Kurtsov | G06F 21/6227 |

(Continued)

OTHER PUBLICATIONS

Bershad et al., "Extensibility, Safety and Performance in the SPIN Operating System", Dec. 1995, Association for Computing Machinery, SOSP '95: Proceedings of the fifteenth ACM symposium on Operating systems principles, pp. 267-283 (Year: 1995).*

(Continued)

*Primary Examiner* — Kevin L Young
*Assistant Examiner* — Jennifer Marie Gutman
(74) *Attorney, Agent, or Firm* — DALY, CROWLEY, MOFFORD & DURKEE, LLP

(57) ABSTRACT

According to embodiments of the present disclosure, a system includes: a microkernel having a low-level application programming interface (API) and providing memory protection domains to user-level processes; and an abstraction layer running on top of the microkernel and comprising a plurality of service extensions to the microkernel and configured to provide a high-level operating system (OS) API for use by one or more application processes running in user space, wherein different ones of the service extensions are configured to run within different ones of the memory protection domains provided by the microkernel.

20 Claims, 11 Drawing Sheets

(56) References Cited

U.S. PATENT DOCUMENTS

| | | | | |
|---|---|---|---|---|
| 2003/0074487 | A1* | 4/2003 | Akgul | G06F 8/656 |
| | | | | 719/331 |
| 2007/0134068 | A1* | 6/2007 | Smith | G06F 9/4401 |
| | | | | 406/39 |
| 2008/0141266 | A1* | 6/2008 | Hunt | G06F 12/109 |
| | | | | 711/E12.091 |
| 2012/0011501 | A1* | 1/2012 | Filali-Adib | G06F 9/45558 |
| | | | | 718/1 |
| 2013/0151849 | A1* | 6/2013 | Graham | G06F 21/85 |
| | | | | 713/164 |
| 2016/0224399 | A1* | 8/2016 | Zheng | G06F 13/24 |
| 2018/0103037 | A1* | 4/2018 | Mullender | G06F 9/45558 |
| 2018/0203626 | A1* | 7/2018 | Bak | G06F 3/0604 |
| 2019/0065736 | A1* | 2/2019 | Dharmadhikari | G06F 9/45533 |
| 2020/0379925 | A1* | 12/2020 | Andrus | G06F 9/546 |
| 2021/0055961 | A1* | 2/2021 | Shah | G06F 21/79 |
| 2021/0357496 | A1* | 11/2021 | Lewis | G06F 16/433 |

OTHER PUBLICATIONS

M. Marley, L. Friedrich, M. Humphrey, J. Stankovic and J. Haskins, "A Survey of Configurable, Component-Based Operating Systems for Embedded Applications", 2001, IEEE Micro, vol. 21, No. 03, pp. 54-68 (Year: 2001).*

Gabber et al., "The Pebble Component-Based Operating System", Jun. 1999, USENIX, Proceedings of the USENIX Annual Technical Conference (Year: 1999).*

Zheng et al., "XOS: An Application-Defined Operating System for Datacenter Computing", 2018, IEEE International Conference on Big Data (Big Data), pp. 398-407 (Year: 2018).*

Abadi, Martin et al. "Control-flow integrity principles, implementations, and applications," ACM Transac-tions on Information and System Security, vol. 13, Issue 1; Oct. 2009; 40 Pages.

Asberg, Mikael et al. "Towards a User-Mode Approach to Partitioned Scheduling in The seL4 Microkernel," ACM Sigbed Review, vol. 10, Issue 3; Oct. 2013; 8 Pages.

Blackham, Bernard et al. "Timing analysis of a protected operating system kernel," 2011 IEEE 32nd Real-Time Systems Symposium; Nov. 2011; 10 Pages.

"CVE—CVE" http://cve.mitre.org/; Accessed Jun. 20, 2022; 1 Page.

Dae, Seung Wie "Wafer-Recyclable, Environment-Friendly Transfer Printing for Large-Scale Thin-Film Nanoelectronics" PNAS; 9 Pages.

David, Francis M. et al. "CuriOS: Improving Reliability Through Operating System Structure," Proceedings of the 8th Symposium on Operating Systems Design and Implementation (OSDI '08), Dec. 2008; 22 Pages.

Dennis, Jack B. et al. "Programming Semantics for Multiprogrammed Computations," Communications of the ACM, vol. 26, Issue 1; Jan. 1983; 13 Pages.

Döbel, Bjorn et al. "Operating system support for redundant multithreading," Proceedings of the tenth ACM International Conference on Embedded Software; Oct. 2012; 10 Pages.

Elphinstone, Kevin et al. "From L3 to sel4 What Have We Learnt in 20 Years of L4 Microkernels?" Proceedings of the 24th ACM Symposium on Operating Systems Principles; Nov. 2013; 18 Pages.

Engler, D. R. "Exokernel: An Operating System Architecture for Application-Level Resource Management," ACM SIGOPS Operating Systems Review, vol. 29, Issue 5; Dec. 3, 1995; 16 Pages.

Fleisch, Brett D et al. "Workplace Microkernel and OS: A Case Study," Software: Practice and Experience, vol. 28, Issue 6; 1998; 24 Pages.

Ford, Bryan et al. "The flux OSKit: A Substrate for Kernel and Language Research," Symposium on Operating Systems Principles; 1997; 14 Pages.

Gadepalli, Phani Kishore et al. "Slite: OS support for near zero-cost, configurable scheduling," 2020 IEEE Real-Time and Embedded Technology and Applications Symposium (RTAS); Apr. 2020; 14 Pages.

Gadepalli, Phani Kishore et al. "Temporal capabilities: Access control for time," 2017 IEEE Real-Time Systems Symposium (RTSS); Dec. 2017; 12 Pages.

Ge, Qian et al. "Time Protection: The Missing OS Abstraction," Proceedings of the Fourteenth EuroSys Conference 2019; Mar. 2019; 14 Pages.

Gefflaut, Alain et al. "The sawmill Multiserver Approach," $9^{th}$ Workshop on ACM SIGOPS European Workshop: Beyond the PC: New Challenges for the Operating System; Sep. 2000; 6 Pages.

Hildebrand, Dan, "An Architectural Overview of QNX," USENIX Workshop on Microkernels and Other Kernel Architectures, Apr. 1992; 16 Pages.

Kang, Dae Y. "Scalable Microfabrication Procedures for Adhesive-Integrated Flexible and Stretchable Electronic Sensors" Sensors; 2015; 18 Pages.

Kim, Yoongu et al. "Flipping Bits in Memory Without Accessing Them: An Experimental Study of DRAM Disturbance Errors," ACM SIGARCH Computer Architecture News, vol. 42, Issue 3; Jun. 2014; 12 Pages.

Klein, Gerwin et al. "seL4: Formal verification of an OS kernel," Proceedings of the ACM SIGOPS 22nd Symposium on Operating Systems Principles; Oct. 2009; 14 Pages.

Kocher, Paul et al. "Spectre Attacks: Exploiting Speculative Execution," 2019 IEEE Symposium on Security and Privacy (SP); May 2019; 16 Pages.

Kuz, Ihor et al. "CAmkES: A Component Model for Secure Microkernel-Based Embedded Systems," Journal of Systems and Software, vol. 80, Issue 5, May 2007; 13 Pages.

"L4Re—Overview" L4Re Runtime Environment; http://l4re.org; Accessed Oct. 6, 2017; 1 Page.

Lee, Chi Hwan et al. "Peel-and-Stick: Mechanism Study for Efficient Fabrication of Flexible/ Transparent Thin-Film Electronics" Scientific Reports; Oct. 10, 2013; 6 Pages.

Lee, Chi Hwan et al. "Transfer Printing Methods for Fabricating Thin-Film Electronics on Non-Conventional Substrates" Stanford University; Aug. 2013; 186 Pages.

Leslie, Ben "Grailos: A Micro-kernel Based, Multi-Server, Multi-Personality Operating System," Workshop on Object Systems and Software Architectures (WOSSA 2006); 2006; 4 Pages.

Lyons, Anna et al. "Scheduling-Context Capabilities: A Principled, Light-Weight Operating-System Mechanism for Managing Time," Proceedings of the Thirteenth EuroSys Conference; Apr. 2018; 16 Pages.

Madden, Michael M. "Challenges Using Linux as a Real-Time Operating System" AIAA Scitech 2019 Forum, 2019; 13 Pages.

Mehnert, F. et al. "Cost and benefit of separate address spaces in real-time operating systems," Proceedings of the 23rd IEEE Real-Time Systems Symposium (RTSS), Dec. 2002; 10 Pages.

Murray, Toby et al. "seL4: From General Purpose to a Proof of Information Flow Enforcement," 2013 IEEE Symposium on Security and Privacy; May 2013; 15 Pages.

Parmer, Gabriel et al. "Predictable Interrupt Management and Scheduling in the Composite Component-Based System," in Proceedings of the IEEE International Real-Time Systems Symposium (RTSS), 2008; 35 Pages.

Parmer, Gabriel et al. "Mutable Protection Domains: Adapting System Fault Isolation for Reliability and Efficiency," IEEE Transactions on Software Engineering; vol. 38, Issue 4; Jul. 2012; 11 Pages.

Parmer, Gabriel "The Case for Thread Migration: Predictable IPC in a Customizable and Reliable OS," Proceedings of the Workshop on Operating Systems Platforms for Embedded Real-Time applications (OSPERT 2010); 2010; 9 Pages.

Rawson, F.L. et al. "Experience with the Development of a Microkernel-Based, Multi-Server Operating System," Proceedings of the 6th Workshop on Hot Topics in Operating Systems (Cat No. 97TB100133); May 1997; 6 Pages.

Ren, Yuxin et al. "Scalable Data-Structures with Hierarchical, Distributed Delegation," Proceedings of the 20th International Middleware Conference; Dec. 2019; 14 Pages.

Saltzer, Jerome H. et al. "The protection of information in computer systems," Proceedings of the IEEE; vol. 63, Issue 9; Sep. 1975; 31 Pages.

(56) References Cited

OTHER PUBLICATIONS

Sewell, Thomas et al. "Complete, high-assurance determination of loop bounds and infeasible paths for WCET analysis," 2016 IEEE Real-Time and Embedded Technology and Applications Symposium (RTAS); Apr. 2016, 30 Pages.

Sewell, Thomas et al. "seL4 Enforces Integrity," International Conference on Interactive Theorem Proving, 2011, 16 Pages.

Sewell, Thomas et al. "Translation Validation for a Verified OS Kernel," Proceedings of the 34th ACM SIGPLAN conference on Programming language design and implementation; Jun. 2013; 11 Pages.

Sha, L. et al. "Priority Inheritance Protocols: An Approach to Real-Time Synchronization," IEEE Transactions on computers, vol. 39, Issue 9; Sep. 1990; 11 Pages.

Shapiro, Jonathan S. et al. "EROS: A Fast Capability System," 17th ACM Symposium on Operating Systems Principles. ACM, Dec. 12, 1999; 16 Pages.

Simos, Mark "Overview of Petya, a rapid cyberattack" Cybersecurity Solutions Group; Feb. 5, 2018; 11 Pages.

Song, Jiguo et al. "Predictable, Efficient System-Level Fault Tolerance in $C^3$," 2013 IEEE $34^{th}$ Real-Time Systems Symposium; Dec. 2013, 12 Pages.

Steinberg, Udo et al. "NOVA: A Microhypervisor-Based Secure Virtualization Architecture," in Proceedings of the 5th European conference on Computer systems; Apr. 2010; 14 Pages.

Wang, Qi et al. "Parallel sections: Scaling System-Level Data-Structures," Proceedings of the Eleventh European Conference on Computer Systems; Apr. 2016; 15 Pages.

Wang, Qi et al. "Stack Management for Hard Real-Time Computation in a Component-Based OS," 2011 IEEE 32nd Real-Time Systems Symposium; Nov. 2011; 12 Pages.

Wang, Qi et al. "Speck: A kernel for scalable predictability," 21st IEEE Real-Time and Embedded Technology and Applications Symposium; Apr. 2015; 12 Pages.

Zuepke, Alexander et al. "Deterministic Futexes: Addressing WCET and Bounded Interference Concerns," 2019 IEEE Real-Time and Embedded Technology and Applications Symposium (RTAS) Apr. 2019; 62 Pages.

Zuepke, Alexander "Turning Futexes Inside-Out: Efficient and Deterministic User Space Synchronization Primitives for Real-Time Systems With IPCP," in 32nd Euromicro Conference on Real-Time Systems (ECRTS 2020); Mar. 6, 2020; 23 Pages.

Jochen Liedtke "On µ-Kernel Construction", ACM Dec. 1995, 14 pages.

* cited by examiner

OPERATING SYSTEM SERVICE EXTENSIONS FOR MICROKERNELS

CROSS-REFERENCE TO RELATED APPLICATIONS

This application claims the benefit under 35 U.S.C. § 119 of U.S. Provisional Patent Application No. 63/189,410 filed on May 17, 2021, which is hereby incorporated by reference herein in its entirety.

STATEMENT REGARDING FEDERALLY SPONSORED RESEARCH

This invention was made with government support under FA8702-15-D-0001 awarded by the U.S. Air Force. The government has certain rights in the invention.

BACKGROUND

Microkernels are operating systems that minimize the amount of software running in the privileged kernel. They are a natural choice for real-time and embedded systems as their small footprint is both suitable for low-resource environments and amenable to in-depth testing and verification. Some microkernels also provide fine-grained isolation and resource access control that can be used to simultaneously minimize fault propagation and build cyber-resilient software stacks on top of the micro-kernel. This is increasingly valuable, as modern embedded systems must manage the competing forces of increasing workload complexity, such as autonomous flight control, and the need for strong security due to their increasingly network connected nature. These systems must additionally rely on diverse input sources (e.g., cameras, GPS, payload sensors), and carry out nuanced control processing tasks based on these inputs, further increasing their exposed attack surface. Further, many services are increasingly being consolidated on a common computing platform. While such systems offer the promise of new technologies and features, their network exposure and advanced software capabilities pose dangerous new attack vectors for cyber criminals.

To mitigate this risk the highest-assurance applications now demand formal verification of the microkernel, such as the seL4 microkernel used in the DARPA HACMS program. Due to its high cost in both time and labor, formal verification inherently limits the functionality that verified software can provide, seL4, for example, provides only a limited subset of standard operating system (OS) capabilities. Consequently, seL4 is often used as a hypervisor, with each virtual machine (VM) partition running a dedicated, featurefull OS (sometimes referred to as "self-contained" or "monolithic" OS), such as Linux. This coarse-grained approach to isolation can limit cyber-attacks between VMs, but unfortunately all the intra-partition vulnerabilities in these guest operating systems remain.

SUMMARY

Disclosed herein is a set of operating system (OS) services, and computing systems utilizing the same, designed to enable microkernels to move beyond their role of hypervisors and to enable performant, high-security isolation of user-space applications that run natively on the microkernel. These services are user-space processes and require no modifications to the microkernel itself, thus preserving any formally verified guarantees. They collectively expose a much more conventional and full-featured system call interface than a typical microkernel, which substantially eases the burden of supporting legacy applications and of developing new ones. These services can also be deployed alongside existing hypervisor-based approaches. This enables partial and incremental transitions for already-fielded systems. Finally, in order to support compatibility with real-time systems, these services are highly predictable with respect to execution time and do not rely on mechanisms that complicate worst-case execution time analysis.

Using the disclosed OS services, a system provides high-assurance cyber-security guarantees (above and beyond that provided by the microkernel) alongside its usability features. This is accomplished using security-by-design approaches that build these guarantees into the system architecture itself. Specifically, three core principles underlie the design and architecture of the disclosed OS services, and enable them to provide this high-assurance cyber-resiliency.

The first principle is functional component isolation. Distinct system services are isolated from the larger system and only able to communicate via their intended interface. This is achieved using several mechanisms. On a system-wide level, each service is instantiated in its own memory protection domain. It can only access hardware resources that it is allowed to according to a system security policy enforced by microkernel-based resource access control (e.g. seL4's Capabilities). Within a protection domain, services are designed to resilient to memory corruption vulnerabilities, which are the largest class of exploitable software flaws. This is currently achieved using memory-safe languages (e.g. Rust), but could also be achieved via other protection mechanisms such as additional formal verification.

The second principle is self-contained processes. In traditional monolithic operating systems, hardware (e.g. memory) and OS resources (e.g. communications channels) allocated by processes are managed by the kernel. This improves system performance, but means that a compromise of the kernel effectively leads to a compromise of the entire system. With the disclosed OS services and systems, processes manage their own resources and only rely on the operating system for initial resource allocation. With this approach, OS services only need to be trusted and benign at time-of-use by a process. A compromise of that service sometime in the future will not enable compromise of user-space applications that have utilized that service in the past, unlike traditional monolithic OS designs. This design is realized implicitly in the design of OS services disclosed herein, and explicitly in the unallocated resource manager and escrow processes described below.

The third principle is siloed software operations. As disclosed herein, multiple software stacks can run in parallel without sharing any common operating system services (beyond the microkernel itself), memory, or hardware peripherals (i.e. in 'silos'). As needed, communications can be enabled between silos by configuring the system at compile-time to share certain, well-defined resources such as memory pages. This approach allows a single system to run software stacks that have differing levels of trust or assurance, by ensuring that faults or successful cyber-attacks in one silo cannot interfere with the operation of software in other silos.

This is realized using three mechanisms. First, silos can be configured with their own instances of the OS services disclosed herein, ensuring that a bug or side-channel in a service cannot be used to cross silo boundaries. Second, at system boot time an initialization task executes to provision each silo with its software inventory and hardware resources. This initializer terminates prior to silo start, ensuring there is no shared software layer beyond the formally verified microkernel. Third, the initializer apportions physical memory in the system such that each silo has its own region of the processor cache and cannot cause contention across silos. This provides two valuable guarantees. First, silos cannot cause temporal interference to other silos by contending for shared hardware resources. The substantially reduces the complexity of worst-case execution time analysis and improves the predictability of workloads, enabling better support for real-time operations. Second, it mitigates a high-bandwidth side-channel known as software timing channels. Such side channels could otherwise be used to exfiltrate data across silo boundaries using well-known techniques such as prime-and-probe cache attacks.

The collective usability and cyber-resiliency guarantees of the disclosed OS services are a novel and high-impact contribution to the state of the art. This technology will enable previously impossible computing systems that are both highly performant and resilient to cyber-attack. The OS services and systems disclosed herein are of most significance to high-assurance real-time embedded systems such as flight control software, embedded cryptography, and cyber-physical systems. They will permit these systems to use their limited hardware resources to safely support software at differing levels of trust, to improve their security posture without needing additional hardware, and to incrementally adopt the technology without requiring a complete system refresh. The latter is of particular importance, as many real-time embedded systems rely heavily on legacy code and have operational lifetimes measured in years or decades.

This disclosure centers on the OS service extensions described above. While focus is given to the seL4 microkernel, the principles, structures, and techniques disclosed may be applied to design and implement a set of OS service extensions for various other microkernels that provide fine-grained resource access control. In other words, the principles, structures, and techniques described herein are only loosely coupled to seL4 and can be adapted to other separation kernels.

According to one aspect of the present disclosure, a system includes: a microkernel having a low-level application programming interface (API) and providing memory protection domains to user-level processes; and an abstraction layer running on top of the microkernel using the low-level API and comprising a plurality of service extensions to the microkernel and configured to provide a high-level operating system (OS) API for use by one or more application processes running in user space, wherein different ones of the service extensions are configured to run within different ones of the memory protection domains provided by the microkernel.

In some embodiments, the microkernel comprises a formally verified microkernel, such as seL4. In some embodiments, the abstraction layer provides one or more OS services not provided by microkernel. In some embodiments, the one or more OS services provided by the abstraction layer include at least one of: a process and thread management service, a channel service, a timer service, a synchronization service, an event handling service, a memory management service, or an I/O service. In some embodiments, the one or more OS services provided by the abstraction layer include a channel service configured to provide inter-process communication (IPC) between different ones of the application processes using communication primitives provided by the low-level API of the microkernel.

In some embodiments, different ones of the service extensions are configured to run as different processes on top of the microkernel. In some embodiments, the abstraction layer is configured to prioritize the processes in which the service extensions run over the application processes using the high-level API.

In some embodiments, the abstraction layer is a first abstraction layer associated with a first silo in which the application processes run, the system further comprising: a second abstraction layer comprising at least some of the same service extensions included within the first abstraction layer, the second abstraction layer associated with a second silo in which other application processes run. In some embodiments, at least some of the plurality of service extensions of the second abstract layer are determined for the second silo at compile time.

In some embodiments, the abstraction layer is configured to run the application processes in user space as self-contained applications. In some embodiments, ones of the self-contained applications have sole ownership over memory and capabilities on which they depend. In some embodiments, the plurality of service extensions includes escrow services configured to force the self-contained applications to terminate. In some embodiments, the plurality of service extensions includes escrow services configured to prevent the self-contained applications from modifying their capability space or metadata.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures.

DETAILED DESCRIPTION

Figure 1:
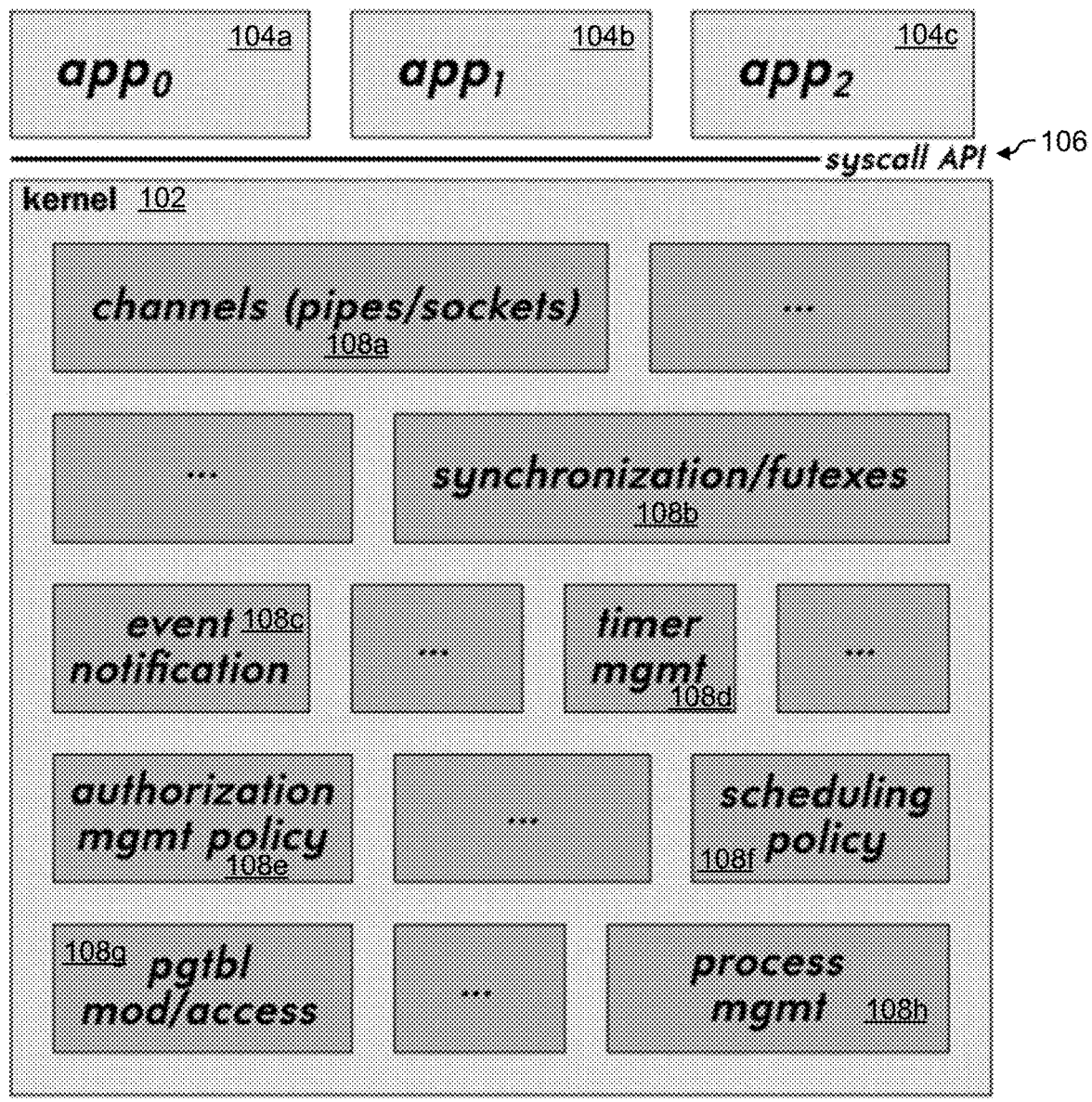
FIG. 1 is a block diagram of a computing system in which applications run on a full-featured OS.

FIG. 1 shows an example of a computing system in which applications run on a full-featured (or "self-contained") OS, such as Linux or QNX, as is known in the art. The illustrative computing system 100 includes a kernel 102 and one or more applications 104a, 104b, 104c, etc. (104 generally) that interface with the kernel 106 using a system call interface 106. In some cases, interface 106 may be a POSIX interface. The kernel 102—which may be described as a monolithic kernel—can include support for core services such as a channel service 108a (e.g., pipes, sockets, and other IPC mechanisms), a synchronization service 108b (e.g., for providing fast mutexes, or "Futexes"), an event notification service 108c, a timer management service 108d, an authorization management policy service 108e, a scheduling policy service 108f, a page table modification/access service 108g, a process management service 108h, among various other OS services. Applications can access the kernel services 108a-108g (108 generally) directly or indirectly via the system call interface 106. In some cases, applications 104 include real-time applications.

Figure 2A:
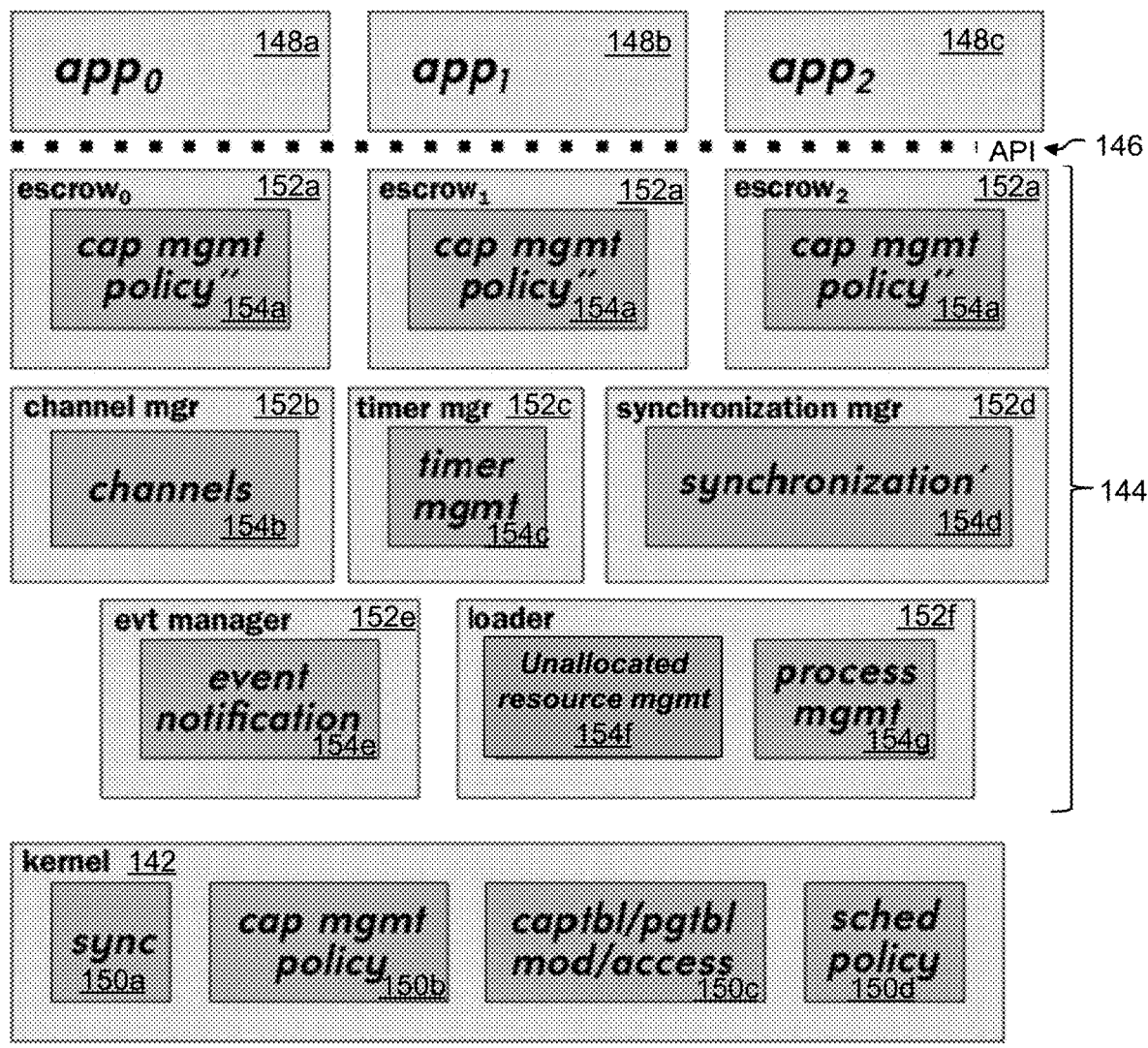
FIG. 2A is a block diagram of another computing system having a microkernel, a set of OS service extensions, and a high-level OS API that can be used by applications, according to an embodiment of the present disclosure.

FIG. 2A illustrates a computing system having a microkernel, a set of OS service extensions, and a high-level OS API (or "high-level API" for short) that can be used by applications, according to embodiments of the present disclosure. The OS service extensions may be designed to be decentralized while also applying the PoLP. As will be discussed further below, the computing system of FIG. 2A can provide not only inter-application isolation, but also on the PoLP-focused isolation between system services. In contrast, the conventional arrangement of FIG. 1 offers only inter-application isolation, and that at a lower level of assurance due to the lack of formal verification. In FIGS. 1 and 2A, memory protection domains (or "protection domains" for short) are shown using boxes with hatching and functional modules (e.g., OS services) are shown using cross hatching.

Modern microkernels use capability-based addressing to access all kernel resources. A capability is an unforgeable token denoting a principal's access to a resource. They enable delegating access to the resource by copying the capability to another principal, and revoking capabilities previously delegated, thus removing access to the corresponding kernel resource.

According to embodiments of the present disclosure, principals are described as having capabilities for protection domains that include a virtual address space (provided by page tables) and the principal's capability tables. Threads executing in a protection domain are confined to the resource accesses allowed by the protection domain. Inter-Process Communication (IPC) provides inter-protection domain coordination, enabling client requests to be handled by logic in a different protection domain than the client, thus with different privileges. Capability-based access control enables a composable, efficient means of manipulating the access to kernel resources and the construction of protection domains. IPC enables the separation of concerns since protection domains specialize to provide mediated access to services.

The guiding principle for microkernels is minimality. "A concept is tolerated inside the microkernel only if moving it outside the kernel [ . . . ] would prevent the implementation of the system's required functionality." Microkernels implement device drivers in user level, which requires translating interrupts into kernel-instigated IPC. System policies for networking, memory management, and time management are implemented in user-level protection domains. Of note, scheduling policy and blocking semantics have traditionally been bound to the kernel, even in L4 variants. L4 is a family of microkernels that includes seL4 among other microkernels.

Microkernels export policies from the kernel to user level and, in doing so, provide a number of benefits. For example, this approach enables configurability of core system policies, minimizes the size of the kernel that must be trusted by all system execution, and enables the separation of concerns for different policies, each implemented in different protection domains. In doing so, it encourages the application of the POLP.

The removal of memory management (esp. allocation) from the kernel is of particular note. The user-level management of kernel memory is safely enabled with kernel-provided memory retyping facilities. Memory typed as frames are otherwise unusable, but are tracked using capabilities. They can be retyped into various forms of kernel memory or retyped into user-accessible virtual memory. This is safe as protection domains can use only capability-accessible memory, and memory can only have a single type (thus protecting kernel data structures from user-level access).

The errant effects of a faulty or compromised service in a monolithic RTOS (e.g., such as illustrated in FIG. 1) can impact all applications. In contrast, disclosed embodiments (such as the computing system of FIG. 2A) move system services into separate protection domains. A failure in one is constrained to its logic, data structures, and any service requests. For example, a failure in the channel service, being used to supply navigational commands from a radio to high-level drone software, will not directly impact a critical safety-of-flight device driver that keeps the drone flying. Thus, disclosed embodiments allow for the implementation of such recovery or reset mechanisms (e.g., using exception models, interface-driven recovery, or redundant execution) that are fundamentally dependent on isolation.

Turning to FIG. 2A, an illustrative computing system 140 includes a microkernel 142, a set of OS service extensions 144, a high-level API 146, and one or more applications 148a, 148b, 148c (148 generally). The OS service extensions 144 and the high-level API 146 are collectively referred to herein as an "abstraction layer." The applications 148 use the high-level API 146 to interface, directly or indirectly, with various OS services (i.e., services provided by microkernel 142 and/or OS service extensions 144). In some embodiments, microkernel 142 is the seL4 microkernel, which provides the following services: inter-process synchronization 150a via seL4 endpoints and notifications; seL4 resource access control capabilities provided to user-space, as indicated collectively by boxes 150b and 150c; and processor scheduling 150d provided to user-space processes.

The seL4 kernel exposes a difficult to use, low-level system call API. In more detail, seL4 provides only a complex API comprising isolation, scheduling, and communication/synchronization primitives. The abstraction layer 144, 146 provides extensive abstractions to hide as much of this complexity as possible by implementing a set of user-space services and abstractions to simplify key operations. OS service extensions 144 are designed and implemented to provide a full-featured RTOS on top of seL4, taking advantage of the integrity and confidentiality guarantees seL4 provides. In particular, seL4's verification ensures that data can only be read or written with permission and that the kernel implements its specification correctly. These powerful guarantees eliminate entire classes of bugs including memory-safety issues, undefined behavior, missing permissions checks, and even logic bugs.

Each of the OS services provided by OS service extensions 144 can have a thread in its own memory protection domain (provided by the microkernel 142), including both capabilities and virtual memory. In the case where microkernel is seL4, these protection domains correspond to self-contained user-level processes that isolate and protect a process's memory and capabilities from all other parts of the system. For example, as shown in the embodiment of FIG. 2A, service extensions 144 include one or more escrow processes 152a, a channel manager process 152b, a timer manager process 152c, a synchronization manager process 152d, an event manager process 152e, and a loader process 152f. As shown, ones of the escrow processes 152a are associated with corresponding ones of the running applications 148. A detailed discussion of escrow processes 152a is provided below in the context of FIGS. 6A-6C.

Each of the processes 152a-152f (152 generally) implement and provide one or more OS services (and, thus, are sometimes referred to herein as "service processes"). In the embodiment of FIG. 2A, escrow processes 152a enforces a capability management policy 154a; channel manager process 152b provides a channel service 154b; timer manager process 152c provides a timer service 154c; synchronization manager process 152d provides a synchronization service 154d; event manager process 152e provides an event notification service 154e; and loader process 152f provides a process management service 154g as well as an unallocated resource management service 154f. Of note, scheduling policy is provided by the sel4 microkernel as illustrated by box 150d in FIG. 2A.

The various processes 152 within OS service extensions 144 provide distribution of responsibility and authority for the management of different system abstractions, thereby adhering to the POLP.

Two services provided by the loader process 152f are central to the entire rest of the system: software loading handled by process management service 154g and unallocated resource management service 154f. Process management service 154g handles the creation and management of processes and threads, including transparently constructing and configuring capability tables, page tables, and thread objects and providing the ability to load a process from an ELF file. The unallocated resource manager service 154f manages unallocated memory for other parts of the system, holding all untyped memory in the system, and allocating capabilities from this memory for the rest of the system 140 (e.g., in accordance with a capability management policy defined for system 140). The rest of the OS service extensions 144 are implemented as a number of services, or dedicated processes, that build on these two core services, each providing a different aspect of the API, like events, timers, or channels.

Further discussion of processes 152, services 154, and high-level interface 146 is provided below.

Figure 2B:
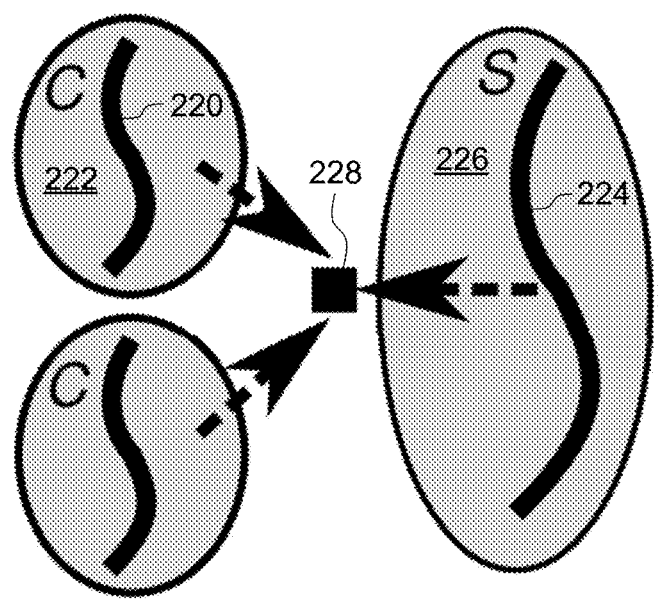
FIG. 2B is a pictorial diagram illustrating IPC via synchronous rendezvous between threads that may be used within the computing system of FIG. 2A.

Each thread in seL4 is bound to its protection domain and communication is performed via IPC, where the sending thread is blocked and the receiving thread made runnable. In particular, seL4 IPC is rendezvous-style IPC and thus synchronous and blocking. This approach is illustrated in FIG. 2B, where a thread 220 of a client component 222 and a thread 224 of a server component 226 rendezvous (i.e., block) on an IPC endpoint 228. Additionally, the scheduling of threads and control over blocking is part of the seL4 kernel and not configurable by user space (as shown by blocks 150d and 150a, respectively, in FIG. 2A). While this makes reasoning about full-system predictability more complex, the seL4 kernel is designed with a fixed-priority scheduler to enable real-time performance Next described is an overview of the high-level OS API 146 provided by computing system of FIG. 2A. The high-level API is summarized in Table I.

TABLE I

High-Level OS API

| API area | API Functions | Description |
|---|---|---|
| Process and Thread Management | process_create( ), process_exit( ), process_get_exit_status( ) thread_create( ), thread_set_params( ), thread_kill( ), thread_exit( ), thread_get_exit_status( ) | Create processes and threads, terminate them, configure them, and retrieve exit status codes |
| Channels | channel_create( ), channel_destroy( ), channel_get_recv( ), channel_get_send( ), channel_retrieve_recv( ), channel_retrieve_send( ), channel_close( ), channel_send( ), channel_recv( ) | Create channels that can be either "named" or "unnamed". These channels have dedicated send and receive sides that must be explicitly opened or retrieved. These sides, then, allow sending or receiving |
| Timers and Time | timer_precision( ), timer_create( ), timer_free( ), timer_start_oneshot( ), timer_start_periodic( ), timer_cancel( ), time_current( ), time_create( ), time_add( ), time_sub( ) | Oneshot and periodic timers that can be canceled. API also exposes the current time and provides functions to manipulate time values |
| Synchronization | semaphore_create( ), semaphore_destroy( ), semaphore_take( ), semaphore_try_take( ), semaphore_give( ) mutex_create( ), mutex_destroy( ), mutex_lock( ), mutex_try_lock( ), mutex_unlock( ) | Standard semaphores and mutexes with take/lock, try take/try lock, and give/unlock operations. Mutexes support priority inheritance and(optionally) recursive locking |
| Event Handling | event_create( ), event_delete( ), event_add( ), event_remove( ), event_wait( ), event_poll( ) | Create/delete event handlers, add or remove event sources, and wait or poll for events. Event sources include timers(fired), channels (ready to receive, ready to send), processes (exited), and others |
| Memory Management | mem_alloc_pages( ), mem_free_pages( ), mem_shared_create_named( ), mem_shared_destroy_named( ), mem_shared_map_named( ), mem_shared_create_anon( ), mem_shared_destroy_anon( ), mem_shared_map_anon( ) | Allocate and release pages of memory as well as create both "named" and "anonymous" shared memory regions and map them into processes |
| I/O | io_print( ) | Output to a shared UART or console |

API Area: Timers and Time

Timers enable time-triggered activations and can be oneshot or periodic. Timer activation occurs in the form of an event that will be delivered through the event-handling API.

In the embodiment of FIG. 2A, a timer manager process 152c is provided and uses a dedicated hardware timer to generate interrupts. This process 152c manages a timer wheel to track software timers and communicate with the event manager process 152e to generate timer events.

API Area: Channels

Channels provide buffered data transfer of messages between endpoints that may be in separate processes. Channels may be either named, allowing them to be addressed globally, or unnamed, requiring them to be shared explicitly. By default, read and write operations are non-blocking, but blocking reads and writes may be optionally implemented. This default behavior avoids inter-application synchronization and encourages blocking awaiting multiple notifications. In the embodiment of FIG. 2A, channels exist in a dedicated channel manager process 152b and all read/write operations are performed as IPC messages to this process 152b.

API Area: Event Handling

The event-handling API enables a caller to be edge-notified of one or more events in either a blocking or non-blocking manner. Events are generated by resources within the OS service extensions in response to events (e.g., a timer firing). By adding one or more of these resources to an event handler, a thread can wait for events on those resources, much like the select( ) and epoll( ) system calls, in Linux. In the embodiment of FIG. 2A, a dedicated event manager process 152e hands notification endpoints to event listeners. Event sources perform an IPC to this process 152e to trigger an event.

API Area: Synchronization

The OS service extensions of FIG. 2A provide synchronization in the form of both mutexes and semaphores. For predictability, mutexes are be implemented to support priority inheritance (PI). A separate synchronization server (i.e., process 152d in FIG. 2A) is used that leverages the client's blocking IPC to halt the thread requesting a lock, while replying only to the highest-priority blocked thread to allocate the lock. Further discussion of how synchronization is implemented on top of seL4 is provided below.

API Area: Thread Management

The high-level API execution abstraction is threads, and conventional (pthread-like) APIs for setting parameters, exiting, and joining on them may be supported. In the embodiment of FIG. 2A, it is implemented within the loader process 152f.

API Area: Memory Management

Memory is dynamically allocated and released and shared memory is supported by the high-level API. Shared memory may be either named, allowing it to be addressed globally, or unnamed, requiring it to be explicitly shared. In the case of seL4, the microkernel 142 sets up memory for the initial loader and capability services. All dynamic memory after that point is allocated by the process management service 152f, in collaboration with the unallocated resource management service 154g. In particular, in the embodiment of FIG. 2A, process management service 152f can expose memory-management APIs, including those for shared memory, to applications 148.

PoLP Design with the seL4 Microkernel

With continued reference to FIG. 2A, the OS service extensions 144 are also be designed and implemented to apply the PoLP on top of the microkernel 142 (e.g., seL4) using the memory protection domains provided by the microkernel 142.

Authority in OS service extensions 144 is distributed throughout the components of computing system 140 by applying the separation of concerns to break the system into separate memory protection domains (i.e., processes 152) each responsible for different resources. There is one service process per resource, namely: channel manager process 152b, event manager process 152e, timer manager process 152c, and synchronization manager process 152d, as well as loader process 152f which is responsible for processes, threads, and memory.

Figure 6A:
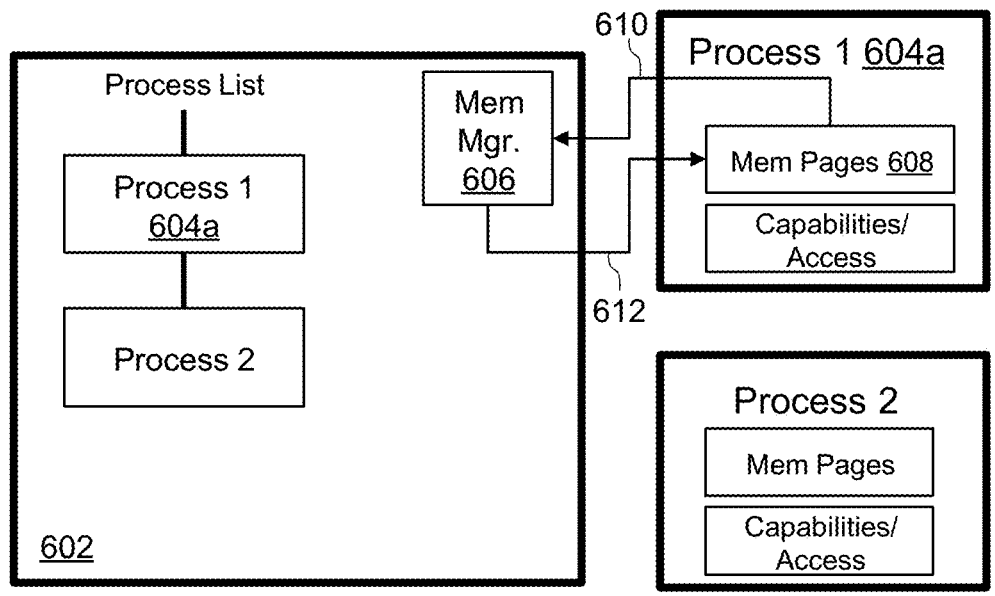
FIGS. 6A-6C are schematic diagrams illustrating self-contained processes that can be implemented within the computing system of FIG. 2A, according to an embodiment of the present disclosure.

In some embodiments, the OS service extensions 144 are also designed for decentralized authority by introducing self-contained application processes, which are discussed below in the context of FIGS. 6A-6C.

Because the threat model addressed herein includes malicious processes, as previously discussed, the internal interfaces between components are particularly important, as they represent attack surface. A variety of different designs for these interfaces are possible, with varying levels of complexity and efficiency. However, a particularly important concern is how well the interface maintains correct behavior in the face of a malicious party. This is often tied to the complexity, or wideness, of the interface: wide interfaces tend to have shared state and implicit protocols about how to update that state while narrow interfaces tend to have partitioned state and explicit protocols about how to communicate state changes.

As an example, consider a correct process communicating over a buffered message queue (e.g., a channel of OS service extensions 144) with a compromised, malicious process. A shared memory implementation may have a wide interface with a number of variables representing the state of the channel. This state needs to be updated using an implicit protocol that the adversary is free to ignore by, for example, placing one message in the queue but claiming to have placed one hundred (100) messages in the queue. The code to check for and safely handle these kinds of issues is complex and frequently incorrect, leading to vulnerabilities.

In contrast, abstraction layer 144, 146 utilizes relatively narrower interfaces that can take advantage of the seL4 kernel's formally verified IPC path to ensure safety from malicious parties. In particular, the seL4 kernel supports IPC messages up to about 480 bytes, by using a special memory page as an IPC buffer, and this implementation is formally verified. Thus, in the embodiment of FIG. 2A, channels are be implemented by storing the message queue in the channel service (inaccessible to processes directly) and using seL4 IPC to communicate with the channel service to send and receive messages. This places the state in the channel service, keeps the data communicated via IPC relatively simple—operation type, channel id, and message data—and can maximally leverage the kernel's formal verification. In some embodiments, this kind of architecture may also be used for mutexes, event handling, and other services provided by the OS service extensions 144.

The OS service extensions 144 may also be designed to places emphasis on predictability. However, it is recognized herein that the ability to provide predictability and minimize interference among tasks is constrained by the microkernel 142 (e.g., seL4), which defines rigid policy for scheduling and blocking in the kernel.

seL4 only provides a fixed-priority scheduler and provides no mechanism to determine a thread's current priority. Thus, embodiments of the present disclosure may prioritize service processes 152 over user applications 148. The service process 152 priorities may be selected such that processes 152 that that interact with hardware have highest priority, followed by the event manager process 152e, the loader process 152f, unallocated resource manager 154f (the loader process 152f essentially becomes the unallocated resource manager 154f after it has finished loading the software stack), and the other services processes 152.

It is recognized herein that adding PI support for mutexes in the synchronization manager process 152d of FIG. 2A can be challenging. In particular, although seL4 has notification capabilities that appear to be well suited for synchronization, with a wait operation that blocks a thread and a signal operation to unblock a single waiting thread, the wait-queue design is FIFO, not priority based, and does not support PI. Thus, an alternative blocking mechanism for mutexes that enables PI is implemented within the OS service extensions 144. This mechanism is designed and implemented to leverage the IPC reply capability generated by a two-way IPC call. Essentially, mutex lock and unlock operations become IPC calls to the synchronization service, which does not reply to the IPC, releasing the thread, until that thread owns the mutex. To provide PI, a copy of each thread's thread capability is supplied to the synchronization manager process 152d prior to the first lock operation by that thread. Then, when a higher-priority thread blocks on a mutex, the synchronization manager process 152d increases the owning thread's priority temporarily using its thread capability.

Figure 3:
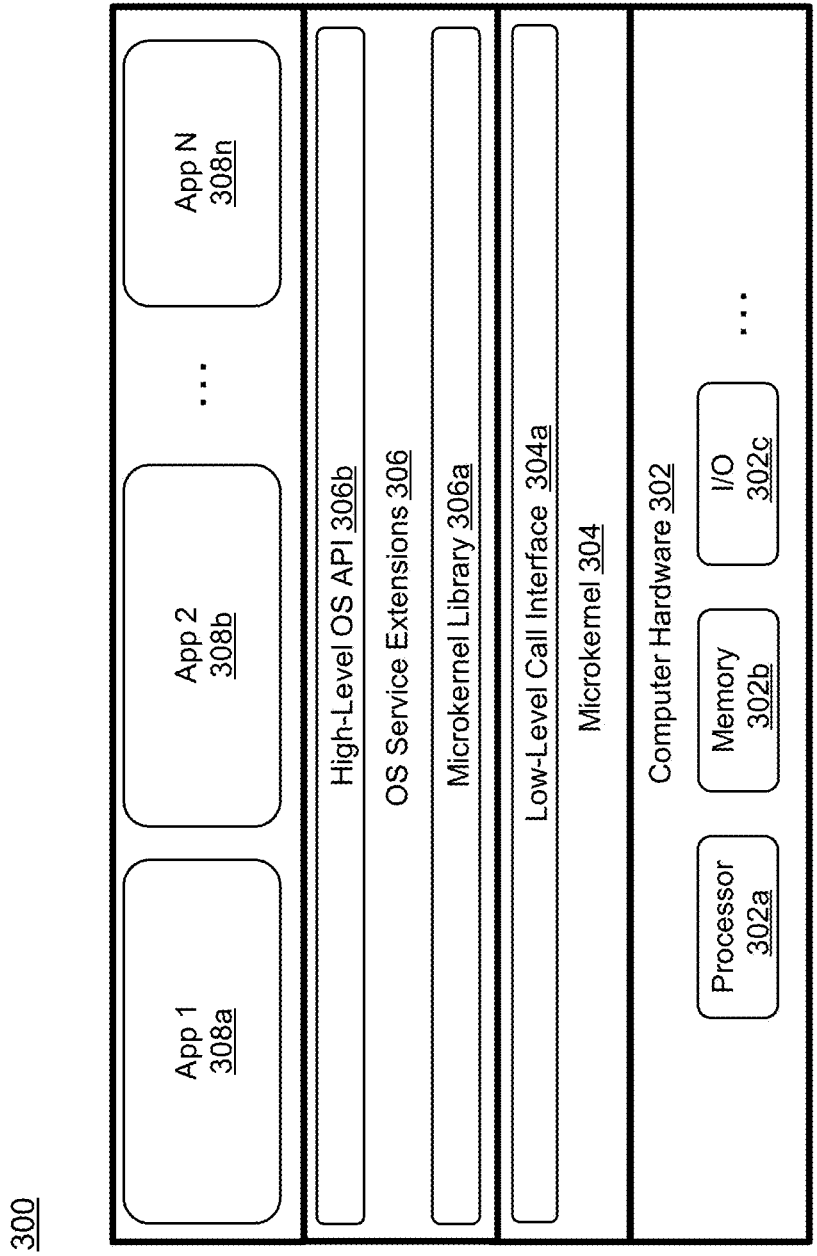
FIG. 3 is a block diagram illustrating a hardware and a software stack that may be provided within the computing system of FIG. 2A, according to an embodiment of the present disclosure.

FIG. 3 is a block diagram showing a hardware and a software stack that may be provided within the computing system 140 of FIG. 2A, according to embodiments of the present disclosure. Illustrative computing system 300 includes computer hardware 302 such as a processor 302a, memory 302b, one or more I/O device interfaces 302c, among other hardware (e.g., hardware typically used in real-time embedded systems).

A microkernel 304, such as seL4, runs on top of the computer hardware 302 and provides a low-level call interface 304a, as previously discussed. A set of OS service extensions 306 run on top of the microkernel 304 using the low-level call interface 304a. The OS service extensions 306—which can be the same as or similar to OS service extensions 144 of FIG. 2A—implement a high-level OS API 306 that are used by one or more user-level applications 308a, 308b, . . . , 308n (308 generally) running on the computing device 300. In some embodiments, high-level OS API 306b provides a POSIX-like system call interface, such as shown in Table I.

In some embodiments, applications 308 link to a libc replacement library that interfaces with high-level OS API 306b to permit native execution of legacy codebases on the microkernel 304. In some embodiments, OS service extensions 306 include or otherwise utilize an existing library 306a that provides some additional functionality on top of microkernel 304, such as the libsel4 library for the seL4 microkernel.

The OS service extensions 306 running on top of microkernel 304 provides an OS suitable for high-assurance, real-time embedded systems. The OS is designed and implemented to focus on isolation between applications 308 and also between core OS services. The OS provides, for example, cyber-resiliency via fine-grained process and data-flow isolation while having practical SWaP constraints. The OS can take advantage of, and extend, a formally verified microkernel, such as SeL4. SeL4's formal verification ensures correctness of its APIs and isolation (functional correctness/integrity proofs) as well as ensuring no storage information leaks through kernel APIs (information flow proofs). To achieve cyber-resiliency, only the formally verified kernel may run in kernel mode, while all other processes, including processes used within the OS service extensions 306, may run in user mode. In some embodiments, cyber-resiliency can further be achieved by implementing OS service extensions 306 using a memory safe programming language, such as Rust. Moreover, and as previously discussed, OS service extensions 306 are implemented as a collection of services (e.g., different processes running within different memory protection domains provided by seL4) such that core OS services and features are isolated from each other (e.g., in terms of memory usage and capabilities). This can reduce the possibility of privilege escalation and compromising of unrelated functionality.

Figure 4:
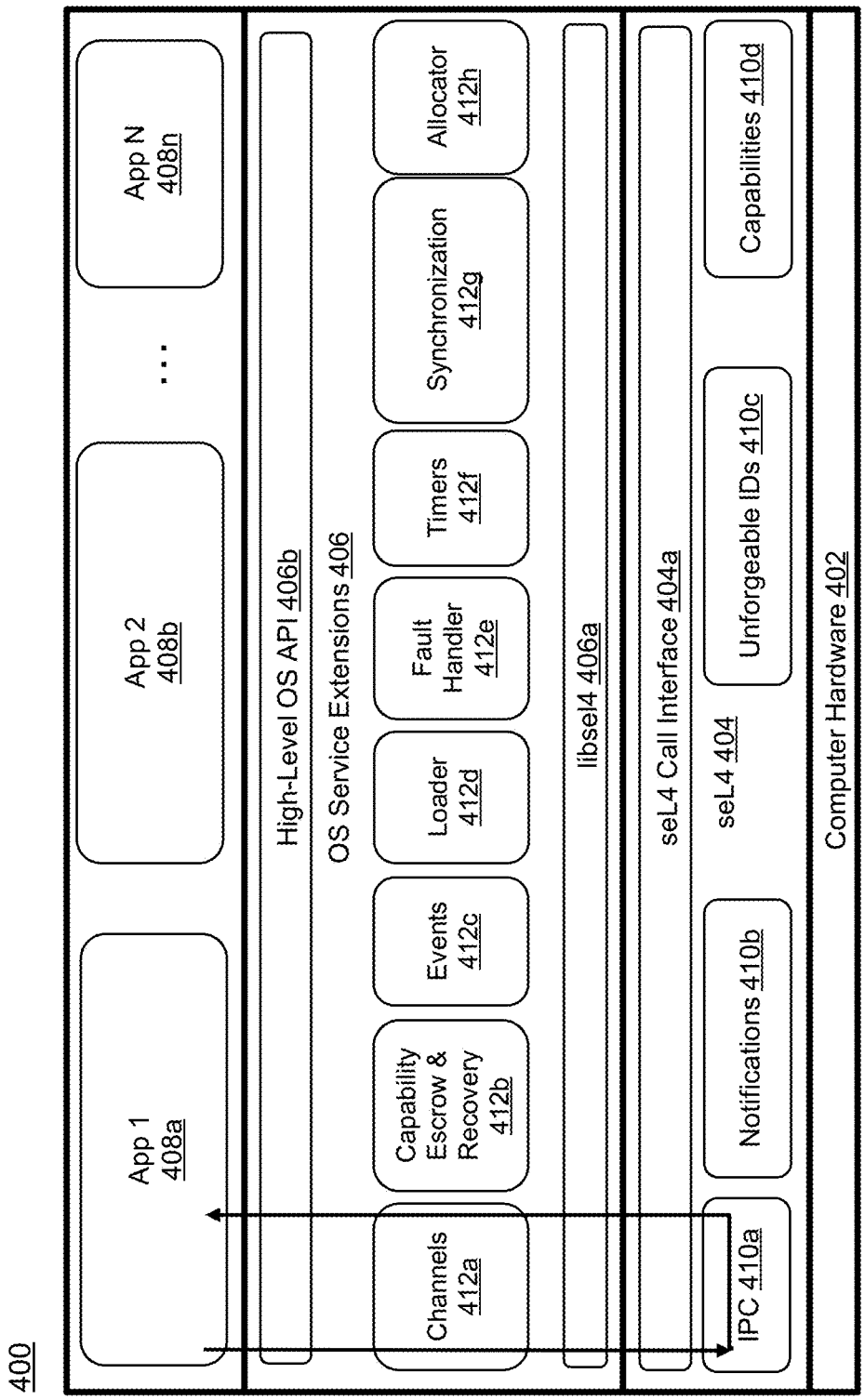
FIG. 4 is a schematic diagram showing additional details of the computing system of FIG. 2A having the sel4 microkernel.

FIG. 4 shows additional details of the computing system 140 of FIG. 2A having the sel4 microkernel, according to embodiments of the present disclosure. Illustrative computing system 400 includes the sel4 microkernel 404 that runs on computer hardware 402 and provides a low-level call interface 404a along with certain microkernel services/features, such as IPC 410a, notifications 410b, unforgeable identifiers 410c, and capabilities 410d. A set of OS service extensions 406 runs on top of sel4 404 using the low-level call interface 404a. The OS service extensions 406 implement a high-level OS API 406b along with a set of services 412a-412g (412 generally). One or more applications 408a, 408b, . . . , 408n (408 generally) can execute on the computing system 400 using the high-level OS API 406b. In some embodiments, high-level OS API 406b provides a POSIX-like system call interface, such as shown in Table I. In the example of FIG. 4, the following services may be implemented and provided by OS service extensions 406: channels 412a, capability escrow & recovery 412b, events 412c, loader 412d, fault handler 412e, timers 412f, synchronization 412g, and allocator 412h. Different services 412 are implemented within, and execute within, different user-level processes (i.e., different protection domains). In some embodiments, OS service extensions 406 includes or otherwise utilizes the libsel4 library 406a, as shown.

Figure 5:
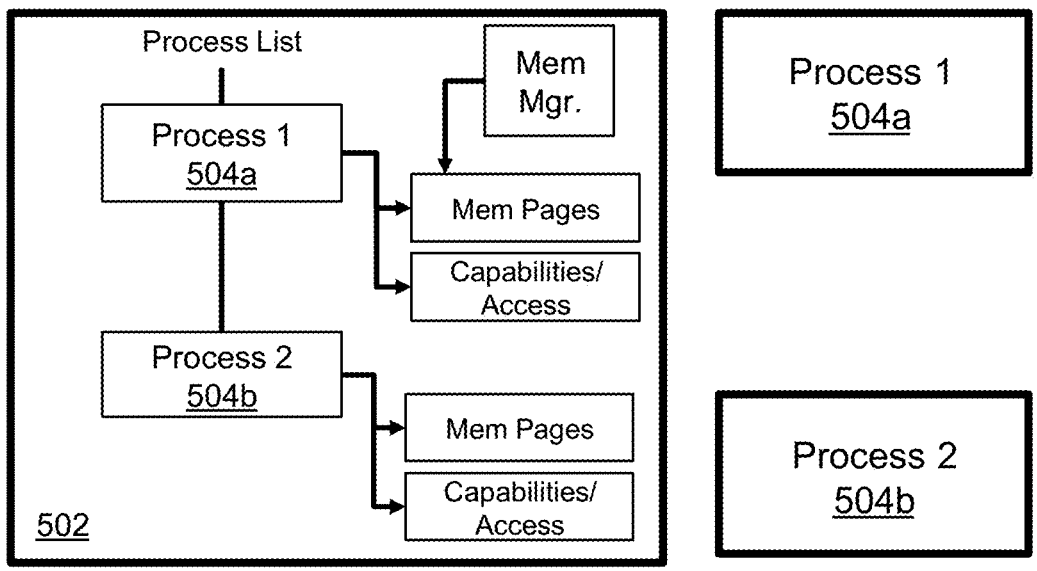
FIG. 5 is a schematic diagram illustrating process resource management in a computing system having a conventional OS.

Turning to FIG. 5 and FIGS. 6A-6C, to provide additional isolation, embodiments of the present disclosure enable applications to run as self-contained application processes (or "self-contained processes" for short). FIG. 5 illustrates process resource management in computing system 500 having a conventional OS 502, such as Linux. As shown, the conventional OS 502 manages all resources (e.g., memory, capabilities/access, etc.) on behalf of application processes 504a, 504b, etc. In contrast, with self-contained processes as disclosed herein, all memory and capabilities that an application process depends on are owned solely by that application. When an OS service requires access to these capabilities, the minimal set of capabilities required by OS are loaned to it by the application process. For example, referring to FIG. 6A, when a memory manager service 606 of OS 602 requires access to a memory page 608 of an application process 604a, the page 608 is loaned to the memory manager service 606 as indicated by arrow 610 and then returned to the process 604a as indicated by arrow 612. Here, the OS 602 corresponds a set of OS service extensions (e.g., OS service extensions 406 of FIG. 4 and/or OS service extensions 144 of FIG. 2A) running on top of a microkernel (e.g., seL4).

Figure 6B:
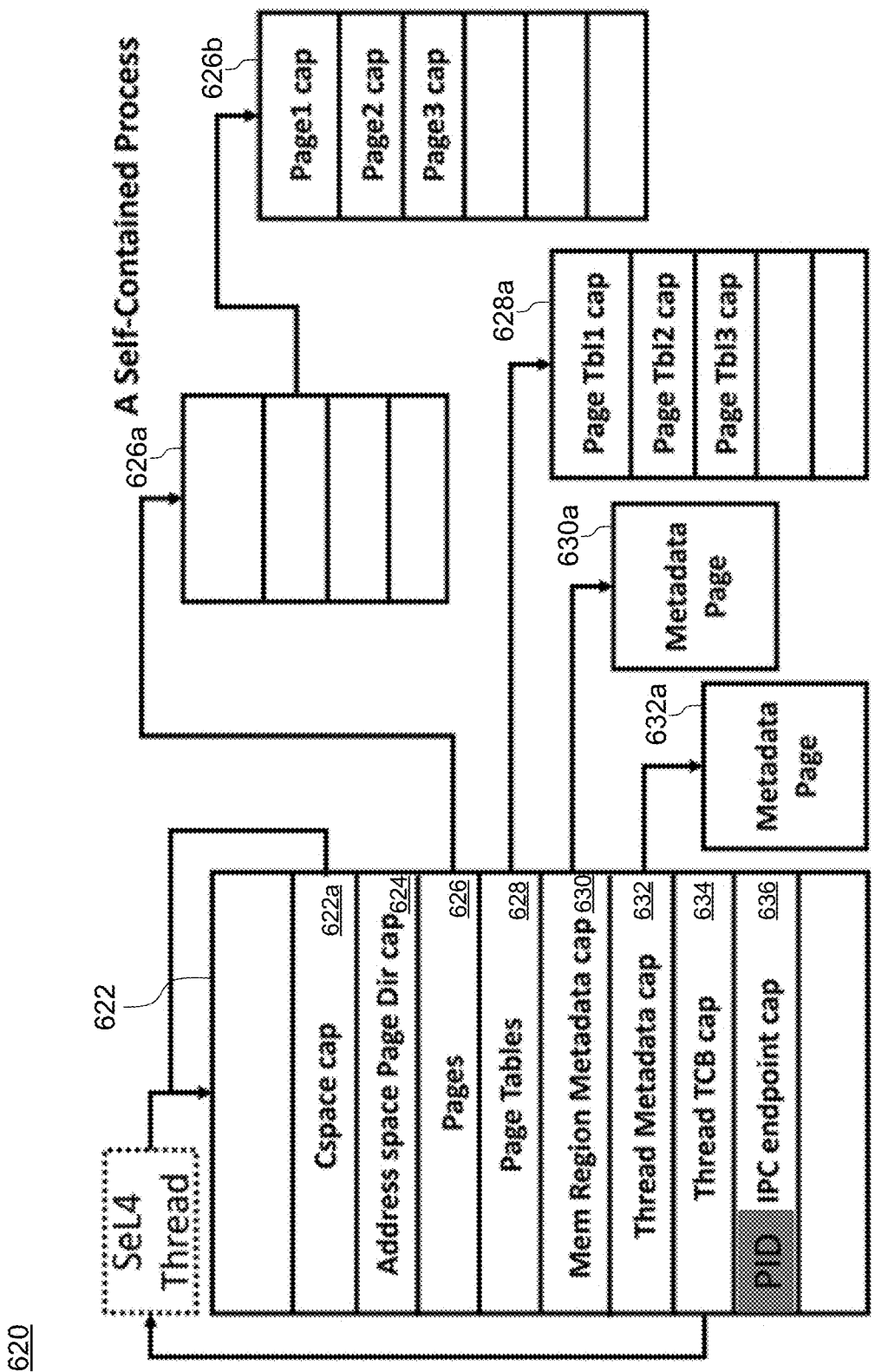

FIG. 6B further illustrates a self-contained process 620, according to some embodiments. To be self-contained means that no other part of the system has access to an application process's capabilities, memory, or identity, including the memory-management code, process-management code, and loader. Other parts of the system can only access this information if the process explicitly requests some operation be performed. This design minimizes privilege by ensuring that no single element of the system has access to all memory or all capability tables or all threads in the system (outside of the formally verified seL4 kernel).

Self-contained processes are valuable for high-reliability systems because they reduce the trusted computing base (TCB) once a process is running and help ensure the ability to recover from failures. In particular, they ensure that even the component that created a process, initialized its address space, or provided its capabilities cannot subsequently modify those capabilities. Thus, once a self-contained process is running and has allocated sufficient memory, it can continue running without needing to place future trust in other elements of the system. This is in contrast to monolithic kernels (e.g., Linux) in which the kernel still retains access to all memory and can arbitrarily remap or unmap memory out from under a process.

The development of self-contained processes is possible primarily because seL4 does not have a process abstraction, but only threads, address spaces, and capability spaces. As a result, a process abstraction can be designed anew. This abstraction includes one or more threads, a virtual address space, a capability space, metadata, and identity, as depicted in FIG. 6B. Capability space is represented by the structure 622 including Cspace capability 622a. Virtual address space is represented by address space page directory capabilities 624, by pages 626 and corresponding structures 626a, 626b, and by page tables 628 and corresponding structure 628a. Metadata is represented by memory region metadata capability 630 and corresponding structure 630a, and by thread metadata capability 632 and corresponding structure 632a. Threads are represented by thread TCB capability 634. Identity is represented by PID IPC endpoint capability 636. The core of a process is its capability space 622, which both contains a capability to itself and contains capabilities for all the other elements of the process, as shown. It is by ensuring that the only capability to this capability space is in itself that the self-contained processes can be achieved. Many capabilities are required for virtual memory, including page-frame capabilities 626b, page-table capabilities 628, 628a, and page-directory capabilities 624, as well as capability-table space 626a, 626b, 628a to store all of these capabilities. This is complicated by the fact that seL4 capabilities allow the owner to modify an object but not query it, necessitating metadata, stored on more pages, to determine where page capabilities are mapped, etc. (the inability to query an object in seL4 comes from the information flow guarantees of the seL4 kernel; the ability to query configuration would expose a trivial storage side channel). Identity can be achieved by badging all IPC endpoints in the process's capability space—the only way it can communicate with the outside world—such that the process's process ID (PID) will be unforgivable conveyed with any IPC messages.

Self-contained processes are a novel security capability disclosed herein that protects applications from potentially compromised OS services. In a typical monolithic operating system (e.g., Linux) all resources used by applications (memory, OS objects like sockets, etc.) are managed by the OS. This improves performance, but means that should the OS become compromised by cyber-attack, all applications are effectively also under attacker control.

Self-contained processes are designed to mitigate this. The OS service extensions disclosed herein are strictly partitioned based on the service they provide (e.g., channel service, timer service, event service). A compromise in one does not impact the other services. Furthermore, unlike traditional OSes, the disclosed OS service extensions do not own or manage resources on behalf of a process. Instead, all memory and system resources used by a process are owned by that process and held within its own memory region, not the OS's. When a process needs a service to perform an action on a resource, that resource is temporarily loaned to the service by the process. At the conclusion of the transaction, the resource is returned to the application and is no longer accessible by the service. What this means from a security perspective is that an OS service only needs to be uncompromised at time-of-use. A compromised service cannot harm applications that used it pre-compromise.

It is recognized herein that a potential risk with self-contained processes is that they afford malicious processes the same strong isolation guarantees afforded other processes. In particular, a self-contained process can resist attempts to terminate it, can prevent its resources from being reclaimed, and can modify its capability space or metadata and then request operations requiring the OS service extensions to parse these structures. Since seL4 capabilities cannot be re-identified once moved, the embodiments of the present disclosure provide control over untrusted processes that may be, or could become, malicious.

In some embodiments, this control comprises two parts: (1) the ability to force controlled termination of an untrusted process, and (2) the ability to prevent untrusted processes from modifying their capability space or metadata arbitrarily. Of note, this is much narrower than the modifications that can be made to any process in traditional systems; in particular, memory maps cannot be changed nor can capabilities be added or removed.

In some embodiments, OS service extensions provide this control using escrow processes, such as escrow processes 152a shown in the computing system 140 of FIG. 2A. An escrow process is a trusted process whose sole role is to manage the capability space (and all the capabilities and metadata stored inside) of an untrusted application process (e.g., a process associated with any of the applications 148 in FIG. 2A). In essence, the escrow process holds a process's capability space "in escrow" making any required modifications on behalf of the process while ensuring that those modifications are done correctly and providing a way to command the process. In the embodiment of FIG. 2A, there is one escrow process 152a for each untrusted application process 148 to avoid centralizing these capabilities in a single service.

The escrow-process executable is part of the core of the OS service extensions (e.g., extensions 144 of FIG. 2A) and is a self-contained process itself. It is designed to hold the capability space of a single untrusted process and perform all legitimate modifications of that capability space on behalf of that process. As a result, requests to other OS services that require a process's capability space must first be sent to the escrow process, to get the capability space, and then sent on to the desired service. Examples of operations requiring the capability space include: starting a new thread, allocating memory pages, and creating an event handler.

Figure 6C:
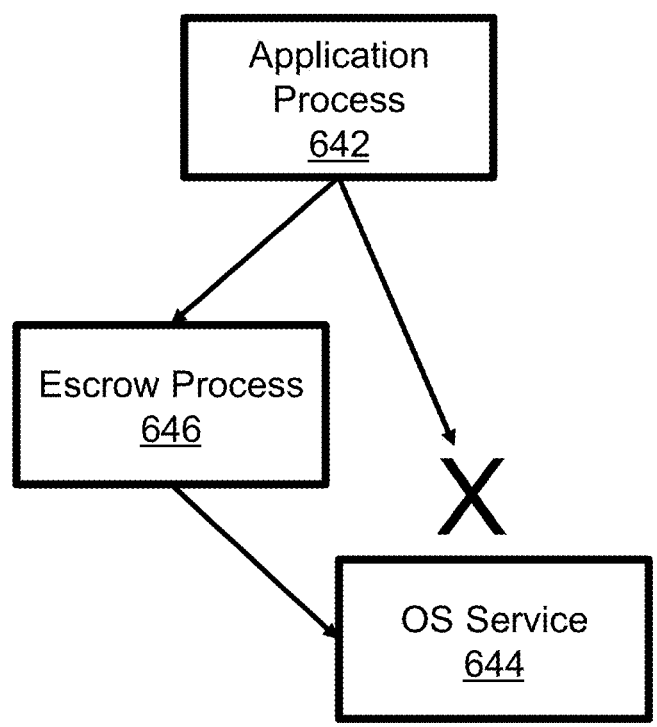

FIG. 6C illustrates operation of an escrow process. As shown, an application process 642 can be prevented from directly accessing an OS service 644 and, instead, is required to access the service 644 indirectly via an escrow process 646 assigned to or otherwise associated with that application process 642. This can prevent application process 642 from performing certain malicious activities. For example, without the required use of escrow process 646, application process 642 could rearrange its capability space to prevent memory from ever being reclaimed by the OS. This is because, in seL4, deleting a CNode Capability (like a capability space) does not delete any CNodes within it and such CNodes become unreachable. Without escrow processes, a malicious process could prevent the reclamation of its memory using this approach. Escrow process 646 can thus be designed and implemented to hold the capability space of application process 642 "in escrow", i.e., making all changes to the capability space on behalf of that other process 642.

In some embodiments, to reduce overhead, escrow processes may only be used for "user" or "application" processes, and not for processes within the seL4 OS service extensions (i.e., not for the processes 152 shown in FIG. 2A).

It is appreciated herein that self-contained processes can provided for bounded trust. In particular, OS services need to be trusted to be correct at time of use and self-contained processes minimize this temporal trust in services. Moreover, self-contained processes can make explicit dependencies that are usually hidden.

Figure 7A:
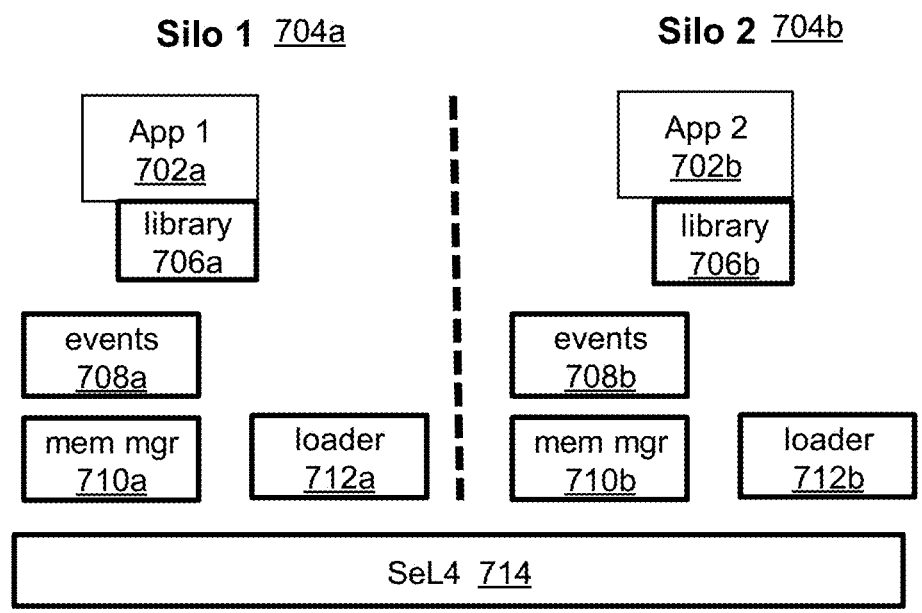
FIGS. 7A-7C are schematic diagrams illustrating silos that can be implemented within the computing system of FIG. 2A, according to an embodiment of the present disclosure.
Figure 7B:
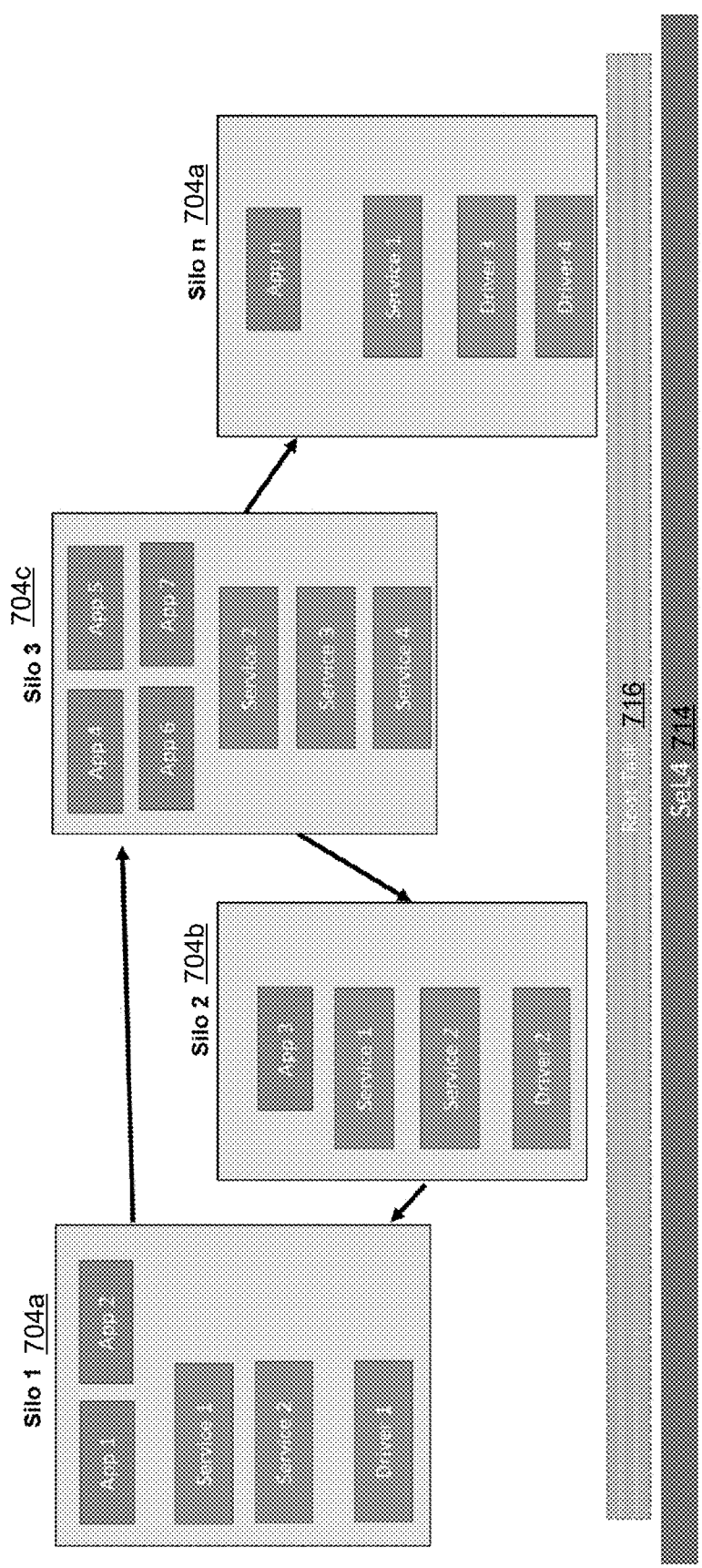
Figure 7C:
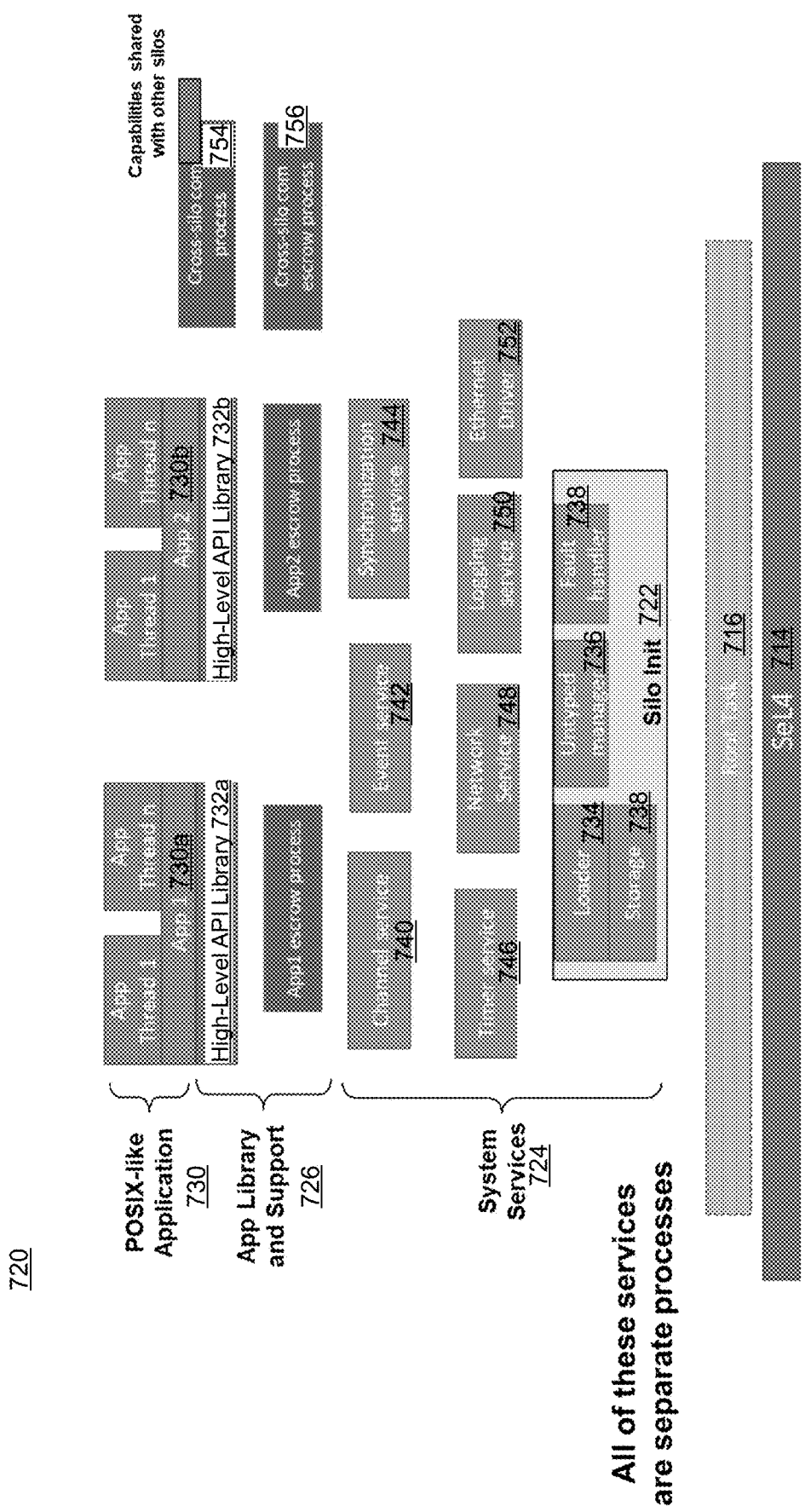

FIGS. 7A-7C are schematic diagrams illustrating silos that can be implemented within the computing system of FIG. 2A having an seL4 microkernel, according to embodiments of the present disclosure. For example, silos can be implemented as a feature of OS service extensions 144 of FIG. 2A.

As disclosed herein, silos are a mechanism for isolating collections of application processes that have differing levels of trust (e.g., potentially malicious versus known benign software) or assurance (e.g., heavily tested versus potentially buggy). Software in one silo cannot, outside of explicitly defined communications channels, influence the state of software running in other silos. This means that software faults cannot propagate across silos, for example, and that a malicious process in one silo is prevented from spreading to others.

For example, referring to FIG. 7A, a first application process 702*a* running within a first silo 704*a* cannot influence the state of a second application 702*b* running within a second silo 704*b*. Each silo 704*a*, 704*b* (704 generally) can have its own libraries 706*a*, 706*b* and OS services, such as separate events services 708*a*, 708*b*, memory manager services 710*a*, 710*b*, and loader services 712*a*, 712*b*. Different silos 704*a*, 704*b* can run on top of a single seL4 microkernel instance 714, as shown.

As shown in FIG. 7B, a root task 716 can be implemented within the OS service extensions (e.g., extensions 144 of FIG. 2A) to handle the setup of silos 704. The number of silos 704 along with the contents can be explicitly configured. Moreover, directed access between different silos 704*a*, 704*b* can be explicitly configured (e.g., as a flow graph). Such configuration is done at system compile time. By default, silos may be configured to share no services, memory, or capabilities.

FIG. 7C shows the internals of a single silo 720, according to some embodiments. As shown, a silo 720 can include a silo initializer service 722 among various other OS services 724 that can be implemented as separate, isolated processes. The silo 720 can run multiple applications 730*a*, 730*b*, etc. (730 generally) each having one or more threads and a library 732*a*, 732*b* that implements the high-level API disclosed herein, along with other application libraries and support 726.

Different high-level API libraries 732*a*, 732*b* may be provide interfaces to different programming languages. For example, a first application 730*a* written in C may link to a high-level API library 732*a* that provides a C interface, whereas a second application 730*b* written in Rust may link to a high-level API library 732*a* that provides a Rust interface.

The root task 716 uses the compile-time information to setup multiple silos 704 at system boot. Once that is complete, the root-task process 716 terminates to ensure that there is no shared software services running between silos.

The silo initializer process 722 can use the compile-time configuration to initialize silo 720 at system boot. In the example of FIG. 7C, silo initializer process 722 can include a loader service 734, an untyped manager service 736, a fault handler service 738, and storage 738. Loader service 734 can handle loading ELF executables, managing processes and threads, and memory management. Untyped manager service 736 can allocates capabilities for the rest of the system from available memory. In seL4, this is equivalent to handling all memory allocation. Fault handler service 738 can reports faults in other system services. The silo initializer process 722 may be the first process loaded within a given silo and can collect capabilities given to this silo, splits into these three services 734, 736, 738, and loads services and executables for this silo. In some embodiments, the three services 734, 736, 73 may be made dependencies of ELF loading.

As also shown in FIG. 7C, OS services 724 provided for a given silo 720 can include a channel service 740, an event service 742, a synchronization service 744, a timer service 746, a network service 748, a logging service 750, and an ethernet driver 752. Channel service 740 can provide asynchronous, buffered channels for use by the rest of the system. Event service 742 can provide an API to create event handlers, add event sources to them, collect events from the system, and wait for events to occur. In some embodiments, a single API may be used to handle events instead of blocking operations everywhere. Synchronization service 744 can provide semaphores and mutexes, with priority inheritance, to the rest of the system. Timer service 746 can implement a timer driver for the hardware platform and expose a high-level API allowing user space to set an arbitrary number of timers. In some embodiments, timer service 746 may also keep track of system time (time since boot). Network service 748 may provide a network stack, exposed to user space with a socket-type API. In some embodiments, network service 748 may be implemented using a Rust network stack, such as smoltcp. Network service 748 may rely on ethernet driver 752 for the actual sending and receiving of packets. Logging service 750 can implement a UART driver for the hardware platform and console I/O. Ethernet driver 752 may include a platform-specific implementation of an ethernet driver. Due to the complexity of this driver, it can be implemented within a separate process.

Cross-silo communication can be implemented by processes 754, 756. In some embodiments, a default implementation of a shared memory queue can be used to communicate between silos. This may require that a silo that needs to communicate is configured with shared memory capabilities to another silo. In some embodiments, applications 730 may implement their own cross-silo communication on top of raw system capabilities.

Fundamentally, silos are defined as regions of memory reserved for use only by the applications running in that silo. Each silo may have L2 cache isolation. In some embodiments, the specific regions assigned to each silo can be chosen such that they are also isolated in the processor's cache. This approach, called cache coloring, mitigates a common class of attacks known as software timing side-channels. Other, non-memory, hardware peripherals (e.g., external sensors) can be assigned to a single silo and cannot be accessed by other silos.

Each silo can have a dedicated collection of OS service extensions according to the present disclosure. The specific set of OS services can be determined by what part of the high-level API is needed by the application layer. This allows for a small memory footprint as possible, since unneeded services are never launched.

Each silo can also be configured to share a set of communications primitives with another silo, setting up an explicit cross-silo data transfer channel. This configuration is done at compile time and may not be changed during the execution of the system. This prevents a potentially malicious process from creating new cross-silo channels and evading protections.

Silos share some features of existing system compartmentalization techniques, namely virtual machines and containers. They have distinct from each in several ways, however, that contribute to their novelty:

Silos Versus Virtual Machines

Virtual machines use a guest operating system distinct from the host operating system. This means a VM with an insecure guest operating system can be compromised by a malicious process within the VM. Silos use disclosed OS service extensions instead of a guest OS. These were designed to operate through cyber-attack via the mechanisms explained elsewhere in this disclosure (e.g., PoLP, compartmented functionality).

Virtual machines provide some isolation in the form of distinct hardware abstractions, but enforce that isolation only loosely. Physical memory can often be unmapped from one VM and re-mapped into another, for example, which can act as a covert channel. Contention for shared resources (e.g., non-volatile storage, processor time) can also be used to either communicate between VMs via side channels, or can be used to attack other VMs via resource exhaustion. Silos do not allow hardware resources to transfer between silos, use memory coloring to mitigate cache-based side channels, and have strict resource quotas on processes within a silo to prevent resource exhaustion.

Silos Versus Containers

Containers can be created and destroyed dynamically during system runtime. This enables more flexibility but comes at the cost of potentially allowing an attacker to spawn their own containers or terminate a victim's. Silos are defined at compile-time and established at boot time before applications are loaded. There is no mechanism by which a process in a silo can create, modify, or destroy any silo, including their own.

As with virtual machines, Containers also often have additional side-channels due to their shared underlying operating system. With silos, the OS service extensions are replicated for each silo, removing this vulnerability.

The inventors of the present disclosure have demonstrated that the implementation of the higher-level RTOS functionalities does increase the codebase over native kernels, but remains much simpler than monolithic systems. Moreover, the inventors have shown that measured overheads of the OS service extensions disclosed herein do not suffer overheads significantly greater than Linux. In many cases, embodiments of the present disclosure demonstrate performance better than Linux. Thus, it is demonstrated that a PoLP-based design of OS service extensions is a reasonable and appealing direction for high-criticality embedded systems. The seL4 implementations disclosed herein provide performance on par with Linux, if not better. This is unintuitive given the larger structural costs in disclosed PoLP-focused embodiments, and given Linux's strong emphasis on average-case performance. These results indicate that despite the focus on strong isolation and the PoLP, embodiments of the present disclosure demonstrate competitive performance. More importantly perhaps, disclosed seL4 implementations demonstrate very stable, predictable performance for key OS functionality, with minimal tail latencies. Thus, the present disclosure advances security-focused RTOSes by demonstrating that the increased security and isolation from a multi-protection domain RTOS does not come at the cost of prohibitive overheads or higher latencies.

There are at least two benefits of the OS service extensions disclosed herein: first, they abstract the low-level API provided by microkernels. For instance, to create and start a new thread under seL4, capabilities must be created from untyped memory for memory such as the stack, and IPC buffer(s). Page directories and page tables must be created and managed, the scheduling priority must be set, and initial register values initialized. In contrast, the high-level OS API described herein provides one call to handle this setup.

Second, disclosed embodiments are designed to separate the API implementation into many separate protection domains. While this may introduce minor overhead, it decouples the different aspects of the API and prevents a fault in a single part of the API implementation from compromising all API calls across all applications. For example, a failure in the channel or event management services will not necessarily impact a high-criticality device driver. Isolation is also fundamental to being able to recover from such failures.

The subject matter described herein can be implemented in digital electronic circuitry, or in computer software, firmware, or hardware, including the structural means disclosed herein and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this disclosure, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

The following definitions and abbreviations are to be used for the interpretation of the claims and the specification. As used herein, the terms "comprises," "comprising," "includes," "including," "has," or "having" or any other variation thereof, are intended to cover a non-exclusive inclusion. For example, a composition, process, method, article, or apparatus that comprises a list of elements is not necessarily limited to only those elements but can include other elements not expressly listed or inherent to such composition, process, method, article, or apparatus.

References in the specification to "one embodiment," "an embodiment," "some embodiments," etc., indicate that the embodiment(s) described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A system comprising a processor and one or more memory devices storing instructions, wherein the processor is configured to execute the instructions to implement:
   a microkernel having a low-level application programming interface (API) and providing respective memory protection domains to user-level processes; and
   an abstraction layer running on top of the microkernel using the low-level API and comprising a plurality of service extensions to the microkernel and configured to provide a high-level operating system (OS) API for use by one or more application processes running in user space, wherein different ones of the service extensions are configured to run within different ones of the memory protection domains provided by the microkernel,
   wherein the abstraction layer is configured to run each one of the one or more application processes in user space as a self-contained application having sole ownership over and controlling access to a memory space and to capabilities on which the self-contained application depends, such that the service extensions and the microkernel have no access to the memory space and the capabilities of the self-contained application without an explicit request from the self-contained application.

2. The system of claim 1, wherein the microkernel comprises a formally verified microkernel.

3. The system of claim 2, wherein the microkernel comprises seL4.

4. The system of claim 1, wherein the abstraction layer provides one or more OS services not provided by microkernel.

5. The system of claim 4, wherein the one or more OS services provided by the abstraction layer include at least one of:
   a process and thread management service,
   a channel service,
   a timer service,
   a synchronization service,
   an event handling service,
   a memory management service, or
   an I/O service.

6. The system of claim 4, wherein the one or more OS services provided by the abstraction layer include a channel service configured to provide inter-process communication (IPC) between different ones of the application processes using communication primitives provided by the low-level API of the microkernel.

7. The system of claim 1, wherein different ones of the service extensions are configured to run as different processes on top of the microkernel.

8. The system of claim 7, wherein the abstraction layer is configured to prioritize the processes in which the service extensions run over the application processes using the high-level API.

9. The system of claim 1, wherein the abstraction layer is a first abstraction layer associated with a first silo in which the application processes run, the system further comprising:
   a second abstraction layer comprising at least some of the same service extensions included within the first abstraction layer, the second abstraction layer associated with a second silo in which other application processes run.

10. The system of claim 9, wherein the at least some of the plurality of service extensions of the second abstract layer are determined for the second silo at compile time.

11. The system of claim 1, wherein the plurality of service extensions includes escrow services configured to force the self-contained applications to terminate.

12. The system of claim 1, wherein the plurality of service extensions includes escrow services configured to prevent the self-contained applications from modifying their capability space or metadata.

13. A system comprising a processor and one or more memory devices storing instructions, wherein the processor is configured to execute the instructions to implement:
- a microkernel having a low-level application programming interface (API) and providing respective memory protection domains to user-level processes; and
- first and second abstraction layers running on top of the microkernel using the low-level API, each abstraction layer comprising a plurality of service extensions to the microkernel and configured to provide a high-level operating system (OS) API for use by one or more application processes running in user space, wherein different ones of the service extensions are configured to run within different ones of the memory protection domains provided by the microkernel, wherein at least one of the first and second abstraction layers is configured to run at least one of the one or more application processes in user space as a self-contained application having sole ownership over and controlling access to a memory space and to capabilities on which the self-contained application depends, such that the service extensions and the microkernel have no access to the memory space and the capabilities of the self-contained application without an explicit request from the self-contained application;

wherein the first abstraction layer is associated with a first silo in which a first of the application processes runs;

wherein the second abstraction layer is associated with a second silo in which a second of the application processes runs; and wherein each one of the first and second silos include a region of memory configured for use only by the abstraction layer and the application processes associated with the respective silo.

14. The system of claim 13, wherein a configuration of the first and second silos is immutable at runtime.

15. The system of claim 13, wherein an application process running in the first silo is prevented from influencing a state of an application process running in the second silo outside of one or more explicitly defined communications channels.

16. The system of claim 13, wherein the microkernel comprises a formally verified microkernel.

17. The system of claim 13, wherein the first abstraction layer or the second abstraction layer provides one or more OS services not provided by microkernel.

18. The system of claim 17, wherein the one or more OS services provided by the first abstraction layer or the second abstraction layer include at least one of:
- a process and thread management service,
- a channel service,
- a timer service,
- a synchronization service,
- an event handling service,
- a memory management service, or
- an I/O service.

19. The system of claim 18, wherein the one or more OS services provided by the abstraction layer include a channel service configured to provide inter-process communication (IPC) between different ones of the application processes using communication primitives provided by the low-level API of the microkernel.

20. The system of claim 13, wherein different ones of the service extensions are configured to run as different processes on top of the microkernel.

* * * * *